United States Patent Office 3,051,252
Patented Aug. 28, 1962

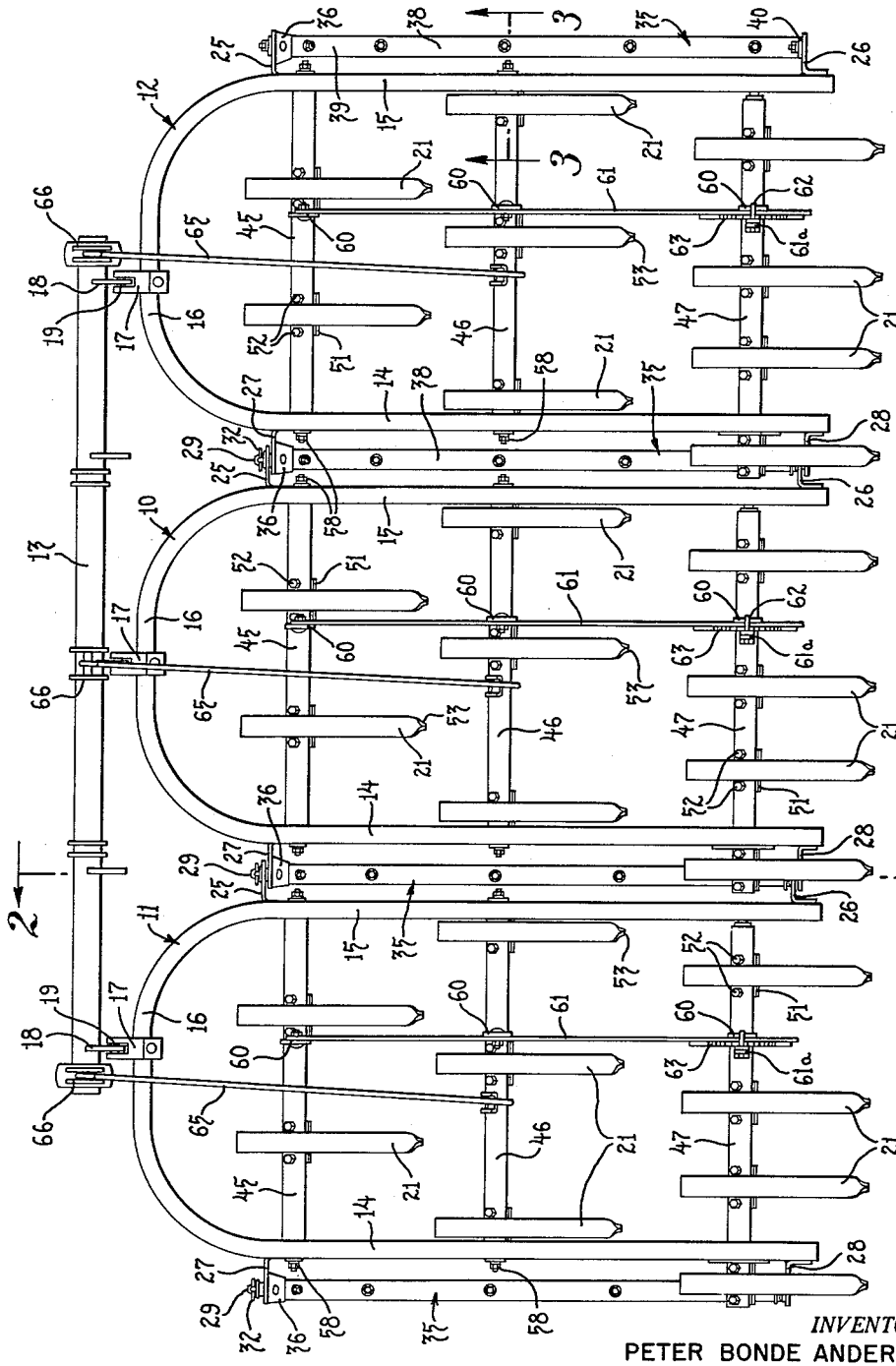

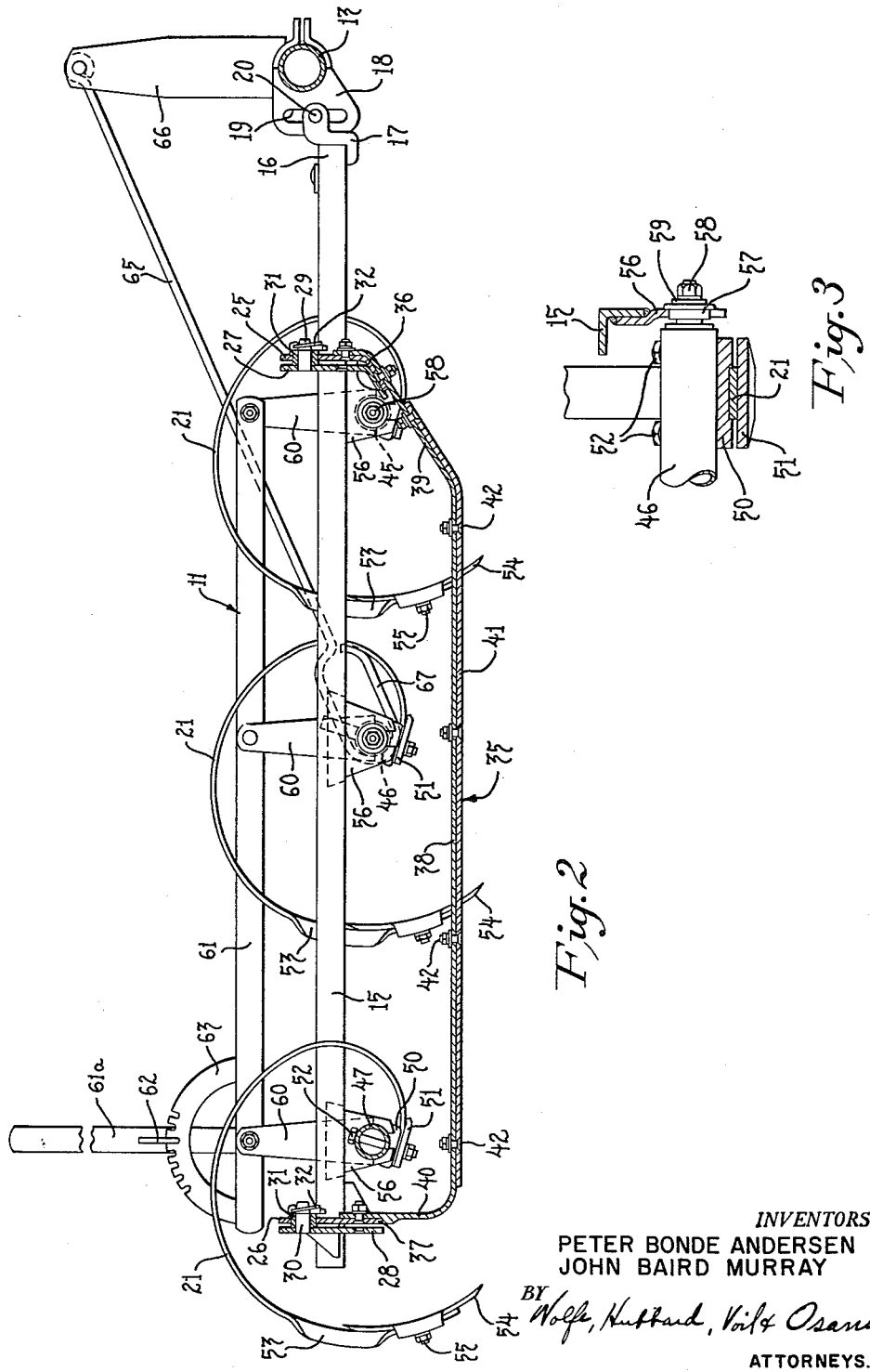

3,051,252
AGRICULTURAL HARROWS
Peter B. Andersen, Ayr, Scotland, and John B. Murray, Wolston, England, assignors to Massey-Ferguson (United Kingdom) Limited, a British company
Filed Feb. 18, 1959, Ser. No. 794,044
2 Claims. (Cl. 172—390)

The invention relates to agricultural harrows generally and more particularly to harrows of the type in which a plurality of units are coupled together to work in side-by-side relationship and in which the coupling affords a substantial degree of flexibility to permit the units to closely follow changing surface contours.

In harrows of the above general character as heretofore constructed, the units are provided with different types of frames depending on whether the unit is to be used as the central unit or one of the side units of the assembled harrow. This, of course, increases the number of different parts that must be manufactured and correspondingly increases production costs.

One object of the invention is to provide an improved harrow unit adapted for use without substantial change in any position of the harrow assembly, thereby simplifying manufacture and materially reducing costs.

Another object is to provide an improved harrow unit and structural elements at opposite sides for coupling adjacent units together which elements are also available for the mounting of skids or comparable height determining means.

Other objects and advantages of the invention will become apparent from the following detailed description of the preferred embodiment illustrated in the accompanying drawings, in which FIGURE 1 is a plan view of a completely assembled harrow made up of three harrow units embodying the features of the invention.

FIG. 2 is a sectional view through the harrow taken in a plane substantially on the line 2—2 of FIG. 1.

FIG. 3 is a fragmentary sectional view taken in a plane substantially on the line 3—3 of FIG. 1.

While a single preferred embodiment of the invention has been shown and will be described herein, this is not intended to limit the invention to the particular form shown. The intention is to cover all modifications and adaptations falling within the spirit and scope of the invention as more broadly or generally characterized in the appended claims.

For purposes of illustration the invention has been shown as embodied in a spring tooth harrow comprising three sections including a center section 10 and end sections 11 and 12, respectively pivotally connected to the left and right sides of the center section. Additional sections may be pivotally connected to the sections 11 and 12 if it is desired to increase the effective width of the harrow. Each of the harrow units is connected at its forward end to a transverse drawbar 13 adapted for connection with a tractor, as, for example, by the three element power elevatable hitch linkage commonly provided on certain types of tractors.

In accordance with one aspect of the invention the harrow sections 10, 11 and 12 are substantially identical in construction so that any section may occupy any position in the assembly. In the preferred form shown, each unit has a generally U-shaped main frame comprising a pair of laterally spaced parallel side members or legs 14 and 15 connected at their forward ends by an arcuate front member 16.

For attachment to the drawbar 13, the front member 16 of each frame carries a coupling element 17 which may conveniently comprise a metal bracket having its end portion forked and projecting forwardly to straddle or nest around a rearwardly projecting coupling element or bracket 18 secured to the drawbar as shown in FIG. 2. The forked ends of the bracket 17 are alined with an aperture 19 in the bracket 18 for the reception of a pin 20 pivotally connecting the elements together. Preferably, the aperture 19 is in the form of a vertically disposed slot, thus allowing the harrow unit to float or ride up and down to a limited extent in addition to pivoting about a transverse axis. The harrow unit is thus enabled to adjust itself to conform to changes in ground contour.

Each unit of the harrow is equipped with a series of ground working tool elements 21. While the tool elements may be of any preferred type and may be arranged in any preferred manner, they have been shown here as spring tines disposed so as to act on substantially the entire ground area over which the unit is drawn. Provision is made for supporting the tines for adjustment of their working depth as will be described in greater detail hereinafter.

Further, in accordance with the invention, provision is made for joining the frames of the units together in a manner which permits any one of the similarly constructed units to be used interchangeably in any position of a multi-unit assembly. For this purpose, one side member of the hitch frame, for example, the right side member 15, has a pair of rigid brackets 25 and 26 projecting laterally outwardly therefrom. The bracket 25 in this instance is located adjacent the front of the frame while the bracket 26 is located adjacent the rear of the frame. Similarly, the left side member 14 of the hitch frame is equipped with two laterally projecting brackets 27 and 28.

In carrying out the invention the brackets 25 and 26 are offset forwardly with respect to the brackets 27 and 28 by approximately the thickness of a bracket and they are spaced apart so as to make overlapping contact with the companion brackets of the adjacent frame when the frames are properly lined up in side-by-side relation as shown in FIG. 1. The brackets of one pair, preferably the rearmost pair 27, 28, are fitted with forwardly projecting coupling pins 29 and 30 while the cooperating brackets 25 and 26 are formed with apertures positioned to receive the coupling pins. The apertures are preferably dimensioned to accommodate sleeves or bushings 31 fitted over the pins to reduce friction and minimize wear on the pins in the relative pivoting of the units. Suitable fasteners such as cotter pins 32 inserted in the holes in the pins 29 and 30 hold the parts in assembled relation. When so assembled the units may rock freely relative to each other and thus maintain the tool elements 21 of the various units at a substantially constant working depth as the harrow is drawn forwardly.

The coupling brackets additionally serve as supports for detachable ground engaging members or skids 35. For this purpose, each front bracket 25, 27 has a portion 36 bent rearwardly and suitably apertured to receive a bolt for attachment of one end of the skid. Similarly, each of the rear brackets 26, 28 is formed with a depending portion 37 apertured to receive a bolt for attachment of the other end of the skid. In use, the skids 35 determine the height of the unit frame relative to the ground.

The skid 35 in its preferred form comprises an elongated metal bar having its end portions bent upwardly and the central portion defining a flat generally horizontal base 38. The front end portion 39 of the skid is bent up at an acuate angle to nest around the portion 36 of one of the front coupling brackets as shown in FIG. 2. The rear portion 40 of the skid is bent upward at right angles to the base portion to overlie the depending portion 37 of one of the rear brackets 26, 28. Preferably each skid is equipped with a wear plate 41 that can be quickly and easily replaced when it becomes worn. As herein shown the wear plate is removably secured to the skid as by bolts 42 having their heads countersunk in the plate.

In accordance with another aspect of the invention the ground working tool elements 21 of the improved harrow are supported in a manner which permits their working depth to be quickly and accurately adjusted. Support is provided for the tool elements 21 by a series of cross members herein shown as tubular in form. The cross members are suitably mounted on the unit frames, the exemplary unit being equipped with three such cross members including front, intermediate and rear members 45, 46 and 47. Front member 45 carries two of the tool elements; member 46 carries three elements and member 47 carries four elements. As will be seen by reference to FIG. 1, the tool elements are staggered with respect to each other so as to uniformly work the soil of the entire area over which the unit is drawn. It will also be noted that the rear cross member is extended beyond the side member 14 of the frame to carry one of the tool elements outside the frame. This insures proper working of the ground between two coupled units.

The tool elements 21 as herein shown are spring tines of conventional shape. In general, they comprise flat bars of spring steel bent into arcuate configuration. One end of the bar, which may be flattened, is interposed between a pair of clamping plates 50 and 51 and rigidly clamped to the cross member by bolts 52. Adjacent its other end, the tool bar is formed with a stiffening rib 53 spaced inwardly from the extreme end portion upon which a replaceable tool tip 54 is secured as by a bolt 55.

The cross members 45, 46 and 47 are supported between the side members 14 and 15 of the unit frame by means of depending brackets 56 welded or otherwise rigidly secured to the side members. Bearing elements 57 fitted in the ends of the cross members engage in suitable apertures in the brackets as shown in FIG. 3 to support the members for rotation about their longitudinal axis. The end portion each of bearing element is threaded for the reception of a nut 58 which, in cooperation with a washer 59, retains the cross member in assembled relation with the frame.

Provision is made for rotating the cross members 45, 46, and 47 in unison to vary the extent to which the working tips of the tool elements project below the plane defined by the skids 35 and thus adjust the working depth of the tool elements. For this purpose, each cross member has a rigid lever arm 60 welded or otherwise secured to it and spaced angularly from the clamped tool element so as to extend generally upwardly when the tool elements are in ground engaging position. The free ends of the lever arms are pivotally secured to a rigid link 61 extending longitudinally of the harrow unit. One of the lever arms 60, preferably the rearmost one, is extended as at 61a to constitute a hand lever by which the rocking of the cross members may be effected for adjusting working depth. A retractable detent 62 carried by the hand lever cooperates with a notched segment 63 fixed to the link 61 to lock the lever and associated elements in adjusted positions.

Provision is made for limiting the rocking movement of the harrow units about their pivots on the drawbar 13 when it is desired to utilize the tractor power lift to raise the harrow for transport. In its preferred form, the limiting means comprises for each unit a tie bar 65 pivoted at its forward end to an upright post 66 rigid with the drawbar. The other end of the tie bar is bent into the form of a loop 67 adapted to encircle one of the tool carrying cross members, preferably the intermediate cross member 46. The loop 67 is dimensioned to permit a substantial amount of lost motion between the cross member and the tie bar leaving the harrow unit free to float about its pivot on the drawbar and thus conform to changes in ground contour.

Upon initial raising of the drawbar by the tractor power lift, the harrow units first rock rearwardly about their pivot connections to the drawbar. When the lost motion between the loops of the tie bars and the cross members is taken up, the entire harrow assembly is lifted as a rigid body. It will be understood that if the harrow is to be used simply as a pull behind implement and is not intended to be lifted in the above manner, the tie bars may be omitted.

It will be apparent from the foregoing that the invention provides a harrow of novel and advantageous construction. The harrow is made up of simple sturdy units of similar construction which are usable interchangeably in any position in a harrow assembly. The number of parts required in the production of such harrows is thus held to a minimum and costs are correspondingly reduced.

The ease with which a harrow may be assembled from the improved units will be readily apparent upon consideration of the simple procedure involved in constructing a three unit harrow such as that illustrated. Initially a unit with tools attached but without skids is selected to serve as the center unit 10. A skid 35 is attached to the brackets 25, 26 on the right hand side member 15 of the selected unit. The coupling element 17 of that unit is then attached to the center bracket 18 on the drawbar 13. If required, the tie bar is attached between the unit and the proper post 66 on the drawbar.

Next, a unit is selected to act as the left hand unit 11. In this case, skids 35 are connected to the brackets provided on both side members 14 and 15 of the frame. The bushings 31 which are normally mounted on the pins 29 for safekeeping are removed from the center unit pins and placed in the holes in the brackets 25 and 26 of the left hand unit. The units may then be coupled together by inserting the pins of the center unit in the bushings now carried by the left hand unit. Insertion of the cotter pins 32 securely locks the units together. The connections between the left hand unit and the drawbar are made as described above for the first unit.

The remaining unit, which will constitute the right hand unit 12, now has a skid fixed to its right hand bracket 25, 26 and its left hand side is connected to the right hand side of the center unit in the manner described above for the coupling of units 10 and 11. The right hand unit is also connected to the drawbar as described for the previous units. The harrow is then completely assembled and ready for complete operation. It will be appreciated that a wider harrow can be constructed if desired by adding additional units which are coupled respectively to the left side of the left hand unit and the right side of the right hand unit.

We claim as our invention:

1. An agricultural harrow comprising, in combination, a transverse drawbar, a plurality of harrow units assembled in side-by-side relation and each pivotally connected at its forward end to said drawbar, said units being alike and each comprising a generally U-shaped frame including spaced parallel side members connected at their forward ends by a front member, cross members supported between the side members of the frame each carrying a plurality of ground working tools, a pair of brackets projecting laterally from each side member of the frame, said brackets being located respectively adjacent the front and rear ends of the side members and spaced apart so that the brackets on the side members of one unit frame overlap the brackets on the side members of the adjacent unit frame upon assembly of and connection of the units with the drawbar, forwardly projecting coupling pins carried by the brackets on one frame member of each unit, the brackets on the other frame member of each unit being apertured to receive said pins for connecting the units together for relative pivotal movements about a fore-and-aft axis, and depending portions on said last mentioned brackets apertured for removable attachment of a skid substantially midway between the two connected sections.

2. An agricultural harrow comprising, in combination, a transverse drawbar, a plurality of harrow units assembled in side-by-side relation and each pivotally connected at its forward end to said drawbar, said units being alike and each comprising a generally U-shaped frame including spaced parallel side members connected at their forward ends by a front member, cross members supported between the side members of the frame each carrying a plurality of ground working tools, a pair of brackets projecting laterally from each side member of the frame, said brackets being located respectively adjacent the front and rear ends of the side members and spaced apart so that the brackets on the side members of one unit frame overlap the brackets on the side members of the adjacent unit frame upon assembly of and connection of the units with the drawbar, coupling pins on the rearmost bracket of each overlapping pair engaging in apertures in the companion brackets for coupling the units together for relative pivoting movements, and elongated skids supported between the front and rear brackets in a position to determine the spacing of the coupled units from the ground.

References Cited in the file of this patent

UNITED STATES PATENTS

| | | |
|---|---|---|
| 611,299 | Washburn et al. | Sept. 27, 1898 |
| 714,819 | Patten | Dec. 2, 1902 |
| 1,384,790 | Warne | July 19, 1921 |
| 1,820,541 | Paul | Aug. 25, 1931 |

FOREIGN PATENTS

| | | |
|---|---|---|
| 500,619 | Canada | Mar. 16, 1954 |